(12) United States Patent
Sakakibara (10) Patent No.: US 6,798,463 B1
(45) Date of Patent: Sep. 28, 2004

(54) TELEVISION RECEIVING APPARATUS

(75) Inventor: Shigeto Sakakibara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 639 days.

(21) Appl. No.: 09/692,328

(22) Filed: Oct. 20, 2000

(30) Foreign Application Priority Data

Oct. 22, 1999 (JP) ............................................ 11-008054

(51) Int. Cl.$^7$ ................................................ H04N 5/50
(52) U.S. Cl. ........................................ 348/732; 725/151
(58) Field of Search ................................ 348/732, 729, 348/558, 733; 725/59, 151

(56) References Cited

U.S. PATENT DOCUMENTS

| | | | |
|---|---|---|---|
| 4,776,038 A | * 10/1988 | Testin et al. | 348/732 |
| 5,087,977 A | * 2/1992 | Suizu | 348/732 |
| 5,170,497 A | * 12/1992 | Uchikura | 455/183.2 |
| 5,280,640 A | * 1/1994 | Bae | 348/732 |
| 5,299,011 A | * 3/1994 | Choi | 348/732 |
| 5,329,364 A | * 7/1994 | Lee | 725/151 |
| 5,479,214 A | * 12/1995 | Sakakibara et al. | 348/558 |
| 5,594,510 A | * 1/1997 | Sakakibara | 348/732 |
| 6,064,449 A | * 5/2000 | White et al. | 348/732 |
| 6,400,422 B1 | * 6/2002 | Nakamura | 348/732 |
| 6,525,779 B1 | * 2/2003 | Sakakibara et al. | 348/558 |

FOREIGN PATENT DOCUMENTS

| | | |
|---|---|---|
| JP | 3-10515 | 1/1991 |
| JP | 06-326935 | 11/1994 |
| JP | 07-087415 | 3/1995 |
| JP | 11-4388 | 1/1999 |
| JP | 3060430 | 4/2000 |

\* cited by examiner

Primary Examiner—John Miller
Assistant Examiner—Scott Beliveau
(74) Attorney, Agent, or Firm—Crowell & Moring LLP (57) ABSTRACT

A microcomputer 50 searches all the frequency bands included in each of the channel plans for TV and CATV almost continuously, determines whether or not there is a broadcasting station in the channel frequencies assigned to each of the channel plans, judges whether or not the channel frequency of a station that is judged to be present is within a fixed frequency range from the center frequency, and counts up the station present channel number for the channel plan to which the station belongs, if the station is within the fixed frequency range from the center frequency, for all the stations that are judged to be present. And a comparison is made between the counted TV channel number and the counted CATV channel number. If the TV count number is greater than the CATV count number, a TV mode is discriminated, while if the TV count number is smaller than the CATV count number, a CATV mode is discriminated.

8 Claims, 9 Drawing Sheets

| CHNL IND | TV (MHz) | CATV NORMAL (MHz) | CHNL IND | TV (MHz) | CATV NORMAL (MHz) | CHNL IND | TV (MHz) | CATV NORMAL (MHz) |
|---|---|---|---|---|---|---|---|---|
| 1 | — | 73.25 | 51 | 693.25 | 385.25 | 100 | | 649.25 |
| 2 | 55.25 | 55.25 | 52 | 699.25 | 391.25 | 101 | | 655.25 |
| 3 | 61.25 | 61.25 | 53 | 705.25 | 397.25 | 102 | | 661.25 |
| 4 | 67.25 | 67.25 | 54 | 711.25 | 403.25 | 103 | | 667.25 |
| 5 | 77.25 | 77.25 | 55 | 717.25 | 409.25 | 104 | | 673.25 |
| 6 | 83.25 | 83.25 | 56 | 723.25 | 415.25 | 105 | | 679.25 |
| 7 | 175.25 | 175.25 | 57 | 729.25 | 421.25 | 106 | | 685.25 |
| 8 | 181.25 | 181.25 | 58 | 735.25 | 427.25 | 107 | | 691.25 |
| 9 | 187.25 | 187.25 | 59 | 741.25 | 433.25 | 108 | | 697.25 |
| 10 | 193.25 | 193.25 | 60 | 747.25 | 439.25 | 109 | | 703.25 |
| 11 | 199.25 | 199.25 | 61 | 753.25 | 445.25 | 110 | | 709.25 |
| 12 | 205.25 | 205.25 | 62 | 759.25 | 451.25 | 111 | | 715.25 |
| 13 | 211.25 | 211.25 | 63 | 765.25 | 457.25 | 112 | | 721.25 |
| 14 | 471.25 | 121.25 | 64 | 771.25 | 463.25 | 113 | | 727.25 |
| 15 | 477.25 | 127.25 | 65 | 777.25 | 469.25 | 114 | | 733.25 |
| 16 | 483.25 | 133.25 | 66 | 783.25 | 475.25 | 115 | | 739.25 |
| 17 | 489.25 | 139.25 | 67 | 789.25 | 481.25 | 116 | | 745.25 |
| 18 | 495.25 | 145.25 | 68 | 795.25 | 487.25 | 117 | | 751.25 |
| 19 | 501.25 | 151.25 | 69 | 801.25 | 493.25 | 118 | | 757.25 |
| 20 | 507.25 | 157.25 | 70 | | 499.25 | 119 | | 763.25 |
| 21 | 513.25 | 163.25 | 71 | | 505.25 | 120 | | 769.25 |
| 22 | 519.25 | 169.25 | 72 | | 511.25 | 121 | | 775.25 |
| 23 | 525.25 | 217.25 | 73 | | 517.25 | 122 | | 781.25 |
| 24 | 531.25 | 223.25 | 74 | | 523.25 | 123 | | 787.25 |
| 25 | 537.25 | 229.25 | 75 | | 529.25 | 124 | | 793.25 |
| 26 | 543.25 | 235.25 | 76 | | 535.25 | 125 | | 799.25 |
| 27 | 549.25 | 241.25 | 77 | | 541.25 | | | |
| 28 | 555.25 | 247.25 | 78 | | 547.25 | | | |
| 29 | 561.25 | 253.25 | 79 | | 553.25 | | | |
| 30 | 567.25 | 259.25 | 80 | | 559.25 | | | |
| 31 | 573.25 | 269.25 | 81 | | 565.25 | | | |
| 32 | 579.25 | 271.25 | 82 | | 571.25 | | | |
| 33 | 585.25 | 277.25 | 83 | | 577.25 | | | |
| 34 | 591.25 | 283.25 | 84 | | 583.25 | | | |
| 35 | 597.25 | 289.25 | 85 | | 589.25 | | | |
| 36 | 603.25 | 295.25 | 86 | | 595.25 | | | |
| 37 | 609.25 | 301.25 | 87 | | 601.25 | | | |
| 38 | 615.25 | 307.25 | 88 | | 607.25 | | | |
| 39 | 621.25 | 313.25 | 89 | | 613.25 | | | |
| 40 | 627.25 | 319.25 | 90 | | 619.25 | | | |
| 41 | 633.25 | 325.25 | 91 | | 625.25 | | | |
| 42 | 639.25 | 331.25 | 92 | | 631.25 | | | |
| 43 | 645.25 | 337.25 | 93 | | 637.25 | | | |
| 44 | 651.25 | 343.25 | 94 | | 643.25 | | | |
| 45 | 657.25 | 349.25 | 95 | | 91.25 | | | |
| 46 | 663.25 | 355.25 | 96 | | 97.25 | | | |
| 47 | 669.25 | 361.25 | 97 | | 103.25 | | | |
| 48 | 675.25 | 367.25 | 98 | | 109.25 | | | |
| 49 | 681.25 | 373.25 | 99 | | 115.25 | | | |
| 50 | 687.25 | 379.25 | | | | | | |

| ERROR DATA No (ADDRESS NUMBER) | ERROR DATA |
|---|---|
| 1 | a VALUE |
| 2 | b VALUE |
| 3 | c VALUE |
| 4 | d VALUE |
| ⋮ | ⋮ |
| 125 | FF |

TELEVISION RECEIVING APPARATUS

BACKGROUND OF THE INVENTION

The present invention relates to a television receiving apparatus capable of receiving a television broadcasting signal in correspondence to two different kinds of channel plans, and more particularly to a television receiving apparatus having an automatic discrimination auto-search function for two kinds of channel plans.

Conventionally, a television receiving apparatus has been provided which is capable of receiving selectively either the TV (television wave) broadcasting or the CATV (cable television) broadcasting. This television receiving apparatus may have an automatic discrimination auto-search function for automatically discriminating whether the receivable channel plan is for TV broadcasting or for CATV broadcasting (e.g., the Unexamined Japanese Patent Application Publication No. Hei 11-4388).

As disclosed in this publication, noticing that the CATV broadcasting has the channels assigned in a specific frequency band (e.g., 300 MHz to 400 MHz) in which none of the TV broadcasting channels are assigned, a CATV mode is discriminated if any broadcasting station exists in the specific frequency band, or a TV mode is discriminated if no broadcasting station exists in the specific frequency band. And in accordance with a result of discrimination, the channel preset is executed, and the channel tuning control is performed, based on the content of the channel preset.

In this way, the conventional television receiving apparatus discriminates a CATV mode or a TV mode in such a manner that the CATV mode is discriminated if a station exists in a specific frequency band in which the TV broadcasting channel is not assigned.

However, with such a conventional discrimination method, since a station may be discriminated to be present due to the influence of the noise, in spite of the station being absent, there is the possibility that a false discrimination may occur by falsely discriminating the CATV mode in spite of the TV mode in essence. Therefore, to reduce such false discrimination as least as possible, the CATV mode may be discriminated in the case where two or more stations exist in a specific frequency band, but in anyway, it is impossible to eliminate the influence of the noise completely.

SUMMARY OF THE INVENTION

This device has been created to solve the above-mentioned problems, and its objective is to provide a television receiving apparatus having improved discrimination accuracy in an automatic discrimination auto-search mode.

In order to solve the above-mentioned problems, a television receiving apparatus of this device capable of receiving signals of a desired frequency in correspondence to a first channel plan having predetermined channel frequencies assigned, and a second channel plan containing the channel frequencies assigned to this first channel plan and having other channel frequencies assigned in a frequency band not assigned to this first channel plan, comprising channel number counting means for counting up the number of station present channels in the channel plan to which a station belongs, if it is judged that the channel frequency of the station is within a fixed frequency range from a center frequency.

In the present device having the above feature, the channel number counting means judges whether or not the channel frequency of a station is within a fixed frequency range from the center frequency, and counts up the number of station present channels in the channel plan to which the station belongs, if the channel frequency of the station is within the fixed frequency range from the center frequency. In this way, in this device, the number of station present channels contained in each channel plan is counted by judging whether or not the channel frequency of the station is within the fixed frequency range from the center frequency during the automatic discrimination auto-search for the channel plan, so that the number of channels can be counted more correctly.

A television receiving apparatus of this device which is capable of receiving signals of a desired frequency in correspondence to a first channel plan having predetermined channel frequencies assigned, and a second channel plan containing the channel frequencies assigned to the first channel plan and having other channel frequencies assigned in a frequency band not assigned to the first channel plan, comprising:

station presence judging means for judging whether a broadcasting station is present or not at a channel frequency assigned to each channel plan by searching all or part of the frequency bands contained in the first channel plan or the second channel plan;

channel number counting means for judging whether or not the channel frequency of the broadcasting station is within a fixed frequency range from a center frequency, if the station presence judging means judges that the broadcasting station is present, and counting up the number of station present channels in the channel plan to which the broadcasting station belongs, if the channel frequency of the broadcasting station is within the fixed frequency range from the center frequency, for all the broadcasting stations which are judged that station is present; and channel plan discriminating means for comparing the number of channels for the first channel plan and the number of channels for the second channel plan which are counted by the channel number counting means, discriminating a first channel plan mode, if the count number for the first channel plan is greater than or equal to the count number for the second channel plan, or discriminating a second channel plan mode, if the count number for the first channel plan is smaller than the count number for the second channel plan.

In this device having the above feature, the station presence judging means searches all the frequency bands contained in the first channel plan or the second channel plan substantially continuously, and judges whether or not a broadcasting station exists at a channel frequency assigned to each channel plan. When this station presence judging means judges that the broadcasting station is present, the channel number counting means judges whether or not the channel frequency of that broadcasting station is within a fixed frequency range from the center frequency, and counts up the number of station present channels in the channel plan to which the broadcasting station belongs, if the channel frequency of the broadcasting station is within the fixed frequency range from the center frequency, for all the stations which are judged that station is present. Thereafter, the channel plan discriminating means compares the number of channels for the first channel plan and the number of channels for the second channel plan which are counted by the channel number counting means, discriminates a first channel plan mode, if the count number for the first channel plan is greater than or equal to the count number for the second channel plan, or discriminates a second channel plan mode, if the count number for the first channel plan is smaller than the count number for the second channel plan. In this way, in this device, since the number of station present channels contained in each channel plan is counted during the automatic discrimination auto-search for the channel plan, and ultimately the channel plan is discriminated depending on whether the total number of channels for the first channel plan is greater than or equal to the total number of channels for the second channel plan or not, whereby it is possible to eliminate the influence of the noise and discriminate the channel mode at high accuracy.

In the television receiving apparatus of this device, the first channel plan is ground wave broadcasting, and the second channel plan is cable television broadcasting. In a channel plan (TV channel plan) for ground wave broadcasting and a channel plan (CATV channel plan) for CATV broadcasting, the channel frequencies of the channel numbers "2" to "13" for TV broadcasting are the same as the channel frequencies of the channel numbers "2" to "13" for CATV broadcasting, and the channel frequencies of the channel numbers "14" to "69" for TV broadcasting are higher by 2 MHz than the channel frequencies of the channel numbers "65" to "94" and "100" to "125" for CATV broadcasting. Also, the channel frequencies of the channel numbers "14" to "64" for CATV broadcasting are in the frequency bands not assigned to the TV broadcasting. Namely, the CATV channel plan includes the channel frequencies equal or close to the channel frequencies assigned to the TV channel plan, and the channel frequencies in the frequency bands not assigned to this TV channel plan.

In a television receiving apparatus of this device, with the above-described configuration, the channel plan discriminating means discriminates whether or not there is a continuous channel among the channels which are judged that station is present, if the count number for the first channel plan is smaller than the count number for the second channel plan, and discriminating a second channel plan mode only if there is the continuous channel, or discriminating a first channel plan mode, if there is no continuous channel. Namely, in the CATV channel plan that is the second channel plan, because the continuous channel necessarily exists, the continuity of the channel is determined if the CATV mode is discriminated based on the comparison of whether the count number for the first channel plan is smaller than the counter number for the second channel plan, so that the discrimination between the TV mode and the CATV mode can be made more correctly.

In the television receiving apparatus of this device, with the above configuration, the channel number counting means stores the error data off the center frequency in a memory, if it is judged that the channel frequency of the station which is judged to be present is outside a fixed frequency range from the center frequency, for all the stations which are judged to be present in the second channel plan. And if the error data for all the stations are stored in the memory, the error data stored in the memory are compared successively to determine whether or not the difference between the error data and the error data is within a fixed frequency range, and classified into some groups, and the number of error data contained in the largest group is further added and counted up to the number of station present channels for the second channel plan. Namely, this device additionally has a procedure (error data check process) for determining whether or not to count up, as the station present in the second channel plan, the station that is not counted as the station present at that time, because the frequency of the station is outside a fixed frequency from the center frequency, though the station has been judged to be present. Thereby, even when the second channel plan is shifted from a normal frequency, it is possible to count up the station as the broadcasting station that is contained in the second channel plan by performing an error data check process, and to effect discrimination between the TV mode and the CATV mode more correctly.

This error data check process will be discussed below in more detail. The channel number counting means performs a process of storing the error data off the center frequency in a memory when it is judged that the channel frequency of the station that is judged to be present is outside a fixed frequency range from the center frequency, for all the stations for the second channel plan which are judged to be present. And the error data first stored in the memory is set as the reference error data, the error data subsequently stored in the memory is set as the comparative error data, and the comparative error data is compared in succession with the reference error data. When the comparative error data is within a fixed frequency range with respect to the reference error data, the comparative error data is determined to be contained within the same group as the reference error data, and the coincidence number is counted up. On the other hand, when the comparative error data is outside the fixed frequency range with respect to the reference error data, it is checked whether or not the next reference error data has been already registered. If not registered, the comparative error data is registered as the next reference error data. Once the next reference error data is registered, the next reference error data is not registered until the current reference error data has been compared with all the comparative error data (i.e., the counting up for one group has been completed). The channel number counting means performs the above process until the comparison between the reference error data first stored in the memory and the comparative error data subsequently stored in the memory has been completed, and the coincidence number for one group is counted up.

Thereafter, the next reference error data registered before and the first error data stored as the comparative error data are compared in the same way as described above, and the coincidence number for another one group is counted up, until the next reference error data is not registered anymore. Thereby, ultimately, there are produced the groups by the number that the next reference error data has been registered. The coincidence number for the largest group among the acquired groups is further added and counted up to the number of station present channels in the second channel plan. Herein, every time the next group is acquired for one group, the comparison is made between both groups, and the group having a greater number of station preset channels is only left behind. In this way, at the time when the error data check process has been ended, only the group having the greatest coincidence number is left behind.

The fixed frequency range as above may be desirably ±200 kHz, because the error data has relatively common discrepancy. Specifically, one step is set to 27.965 kHz, and the frequency may be changed in a range of ±8 steps (i.e., ±223.72 kHz) to effect grouping of the error data.

BRIEF DESCRIPTION OF THE DRAWINGS

FIG. 2 is an explanatory diagram showing the channel plans for TV broadcasting and CATV broadcasting in a table form.

DETAILED DESCRIPTION OF THE PREFERRED EMBODIMENTS

The preferred embodiments of this device will be described below with reference to the drawings.

Figure 1:
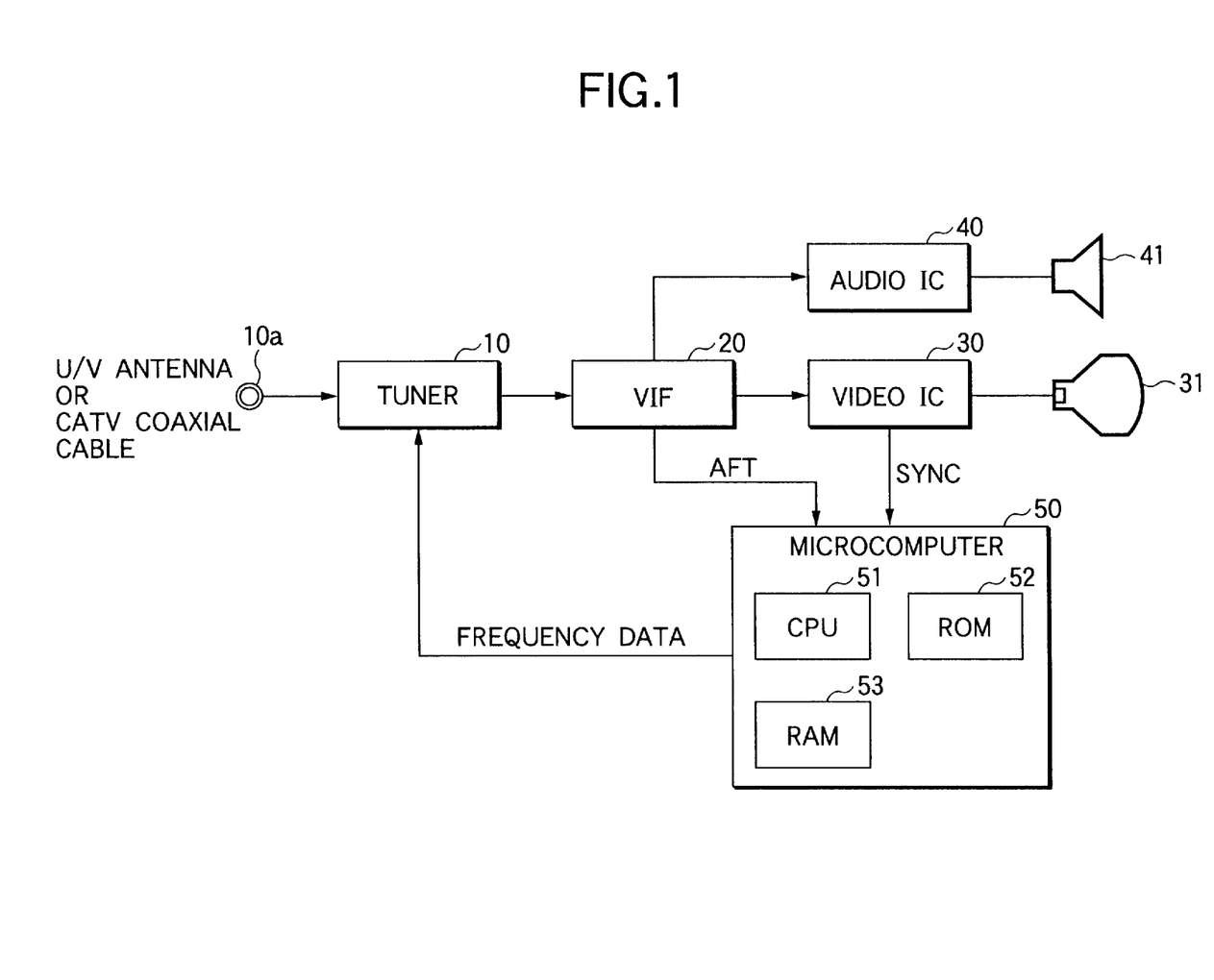
FIG. 1 is a block diagram showing the hardware configuration of a television receiving apparatus of this device.

FIG. 1 is a block diagram showing the hardware configuration of a television receiving apparatus according to an embodiment of the present device.

In the same figure, any one of a U/V antenna and a CATV (NORMAL) coaxial cable can be connected to a picture and sound input terminal 10a of a tuner 10. The tuner 10 receives signals of a desired frequency in correspondence to television broadcasting bands for both TV broadcasting and CATV broadcasting, as well as selectively amplifying the required signals that have been received into radio frequency signals, and converting the amplified radio frequency signals into intermediate frequency signals. In this embodiment, the tuner 10 employs a so-called PLL channel tuning control system, which controls the reception frequency by directly controlling the local oscillation frequency, based on the input of predetermined frequency data.

An intermediate frequency signal output from the tuner 10 is amplified into a picture intermediate frequency signal by a VIF circuit 20, which is then output to a video IC 30. Also, a sound intermediate frequency signal is picked up in a process of picture intermediate frequency amplification, FM detected by an audio IC 40, appropriately amplified, and supplied to a speaker 41.

On the other hand, in the video IC 30, the input picture intermediate frequency amplification signal is picture detected. Then the horizontal and vertical synchronizing signals are separated, based on the detected output, and output to respective horizontal and vertical output stages. The VIF circuit 20 generates an AFT voltage in accordance with a drift between the actual frequency of picture carrier and the reference frequency, this AFT voltage and the synchronizing signals separated in the video IC 30 being supplied to a microcomputer 50. A picture signal output from the video IC 30 is supplied to a picture tube 31 such as a CRT.

Figure 3:
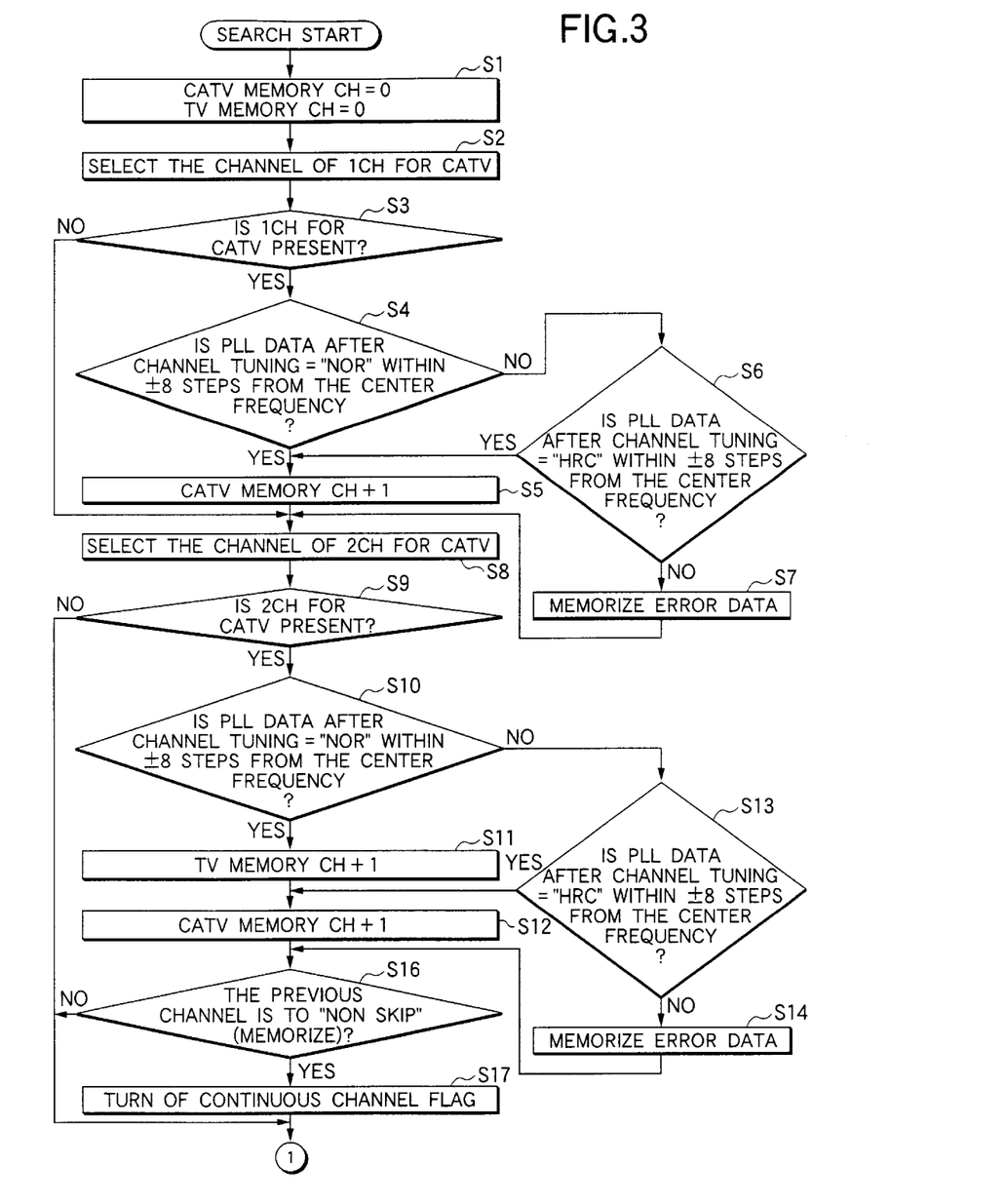
FIG. 3 is a flowchart showing an operation procedure of an auto-search performed by an automatic discrimination auto-search program.
Figure 8:
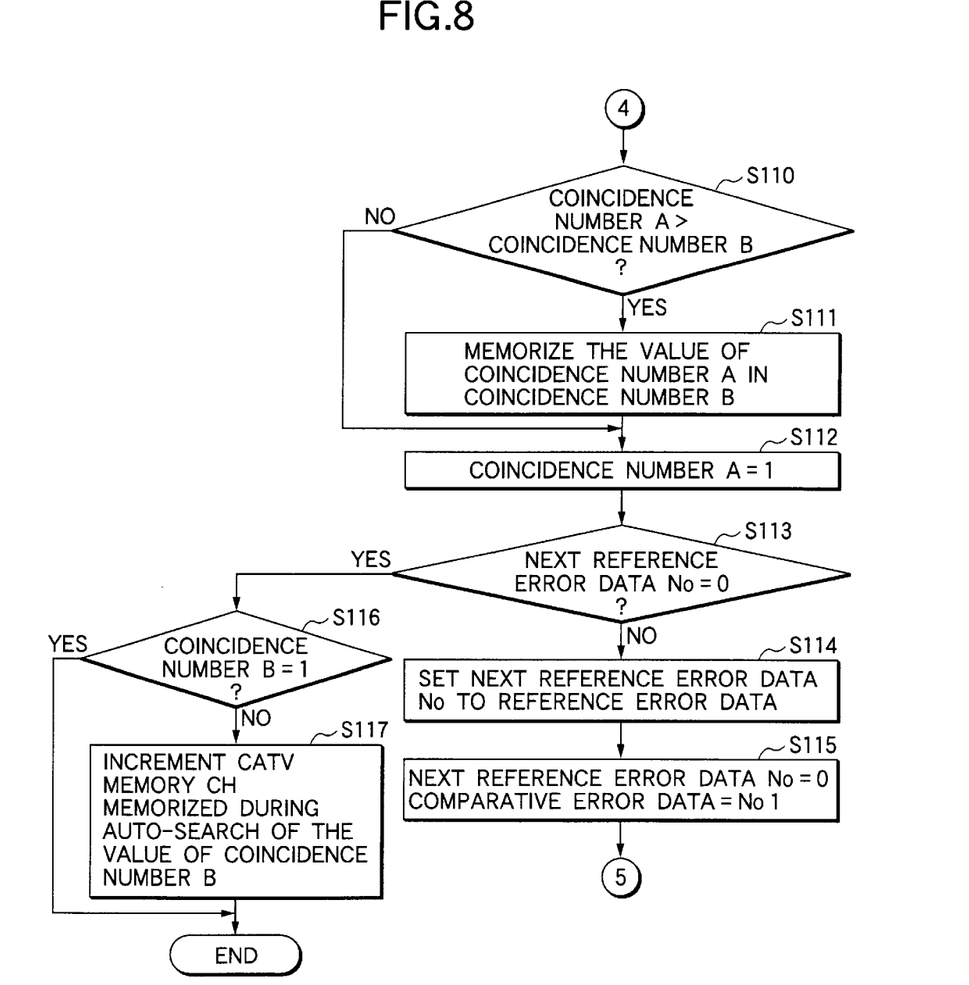
FIG. 8 is a flowchart showing the error data check process.

The microcomputer 50 has a program executing operation environment comprised of a CPU 51, a ROM 52, and a RAM 53, and controls the channel tuning of the tuner 10 by supplying the frequency data to the tuner 10. This channel tuning can employ various surrounding techniques to change the channel tuning frequency of the tuner 10 in accordance with a channel tuning signal represented in a predetermined hexadecimal format, though not detailed here. In the ROM 52, the channel plans consisting of the frequency and the corresponding channel number (CHNL IND) are stored in a table form for the TV broadcasting and the CATV broadcasting (CATV NORMAL, CATV HRC, CATV IRC), as shown in FIG. 2. Also, in the ROM 52, an automatic discrimination auto-search program to effect the automatic discrimination of two kinds of channel programs is stored, as shown in FIGS. 3 and 8.

Herein, the channel plan as shown in FIG. 2 will be described below.

In the TV channel plan and the CATV channel plan, the channel frequencies of the channel numbers "2" to "13", for TV broadcasting are the same as the channel frequencies of the channel numbers "2" to "13" for CATV broadcasting, and the channel frequencies of the channel numbers "14" to "69" for TV broadcasting are higher by 2 MHz than the channel frequencies of the channel numbers "65" to "94" and "100" to "125" for CATV broadcasting.

The CATV channel plan has three kinds of channel plans including CATV NORMAL, CATV HRC and CATV IRC. The frequencies of the channel numbers "1" to "125" for HRC are lower by 1.25 MHz than the frequencies of the corresponding channel numbers for NORMAL, respectively, except for the channel numbers "5" and "6", and the frequencies of the channel numbers "5" and "6" are higher by 0.75 MHz than the frequencies of the channel numbers "5" and "6" for NORMAL, respectively. On the other hand, the frequencies of the channel numbers for IRC are the same as the frequencies of the corresponding channel numbers for NORMAL, respectively, except for the channel numbers "5" and "6", and the frequencies of the channel numbers "5" and "6" are higher by 2 MHz than the frequencies of the channel numbers "5" and "6" for NORMAL, respectively.

The automatic discrimination auto-search operation of the television receiving apparatus in the TV mode and the CATV mode will be described below.

The automatic discrimination auto-search operation is effected by operating a predetermined key, not shown. By operating the predetermined key, the microcomputer 50 detects this key operation and executes an automatic discrimination auto-search program as shown in FIGS. 3 and 8 which is stored in the ROM 52. That is, in this embodiment, station presence judging means, channel number counting means, and channel plan judging means as defined in the claims are realized by the microcomputer 50. Note that the channel number "1" is abbreviated as 1ch as a matter of convenience.

Firstly, an auto-search operation procedure by this automatic discrimination auto-search program will be schematically described below, and then more specifically described in accordance with the flowcharts of FIGS. 3 and 8.

In this embodiment, the automatic discrimination auto-search selects the channels 1ch to 13ch for CATV, then selects from CATV 14ch to TV 14ch to CATV 15ch to TV 15ch . . . up to 69ch, and selects CATV 70ch to 125ch. If there is any broadcasting station during the auto-search, a determination is made whether or not the frequency after tuning falls within a predetermined frequency range (±200 kHz of the center frequency for TV, CATV, NOR/HRC/IRC). If the frequency after tuning falls within the predetermined frequency range, the count number for TV or CATV is incremented by 1 (in a TV or CATV count area in the ROM 53). However, this count number is intended to discriminate the TV mode or CATV mode, and the intrinsic channels are also preset outside this predetermined frequency range.

In this counting process, in the case where the frequency after tuning does not fall within ±200 kHz of each center frequency for CATV NOR/HRC/IRC (drifts from the normal channel plan) during the auto-search of the channel for CATV, the error frequency data from the center frequency of the channel plan for CATV NORMAL (NOR) is memorized in an error data storage area (a separate area from the counting area) of the RAM 53. It is only the CATV channel plan that this error frequency data (hereinafter referred to as error data) is memorized, and the error data storage area of the RAM 53 is prepared by the size of 125ch.

If the auto-search up to 125ch for CATV has been finished, a check process for the error data that has been memorized as outside the predetermined frequency range in selecting the CATV channel is started. This check process will be described later in detail.

And the count value acquired through the check process for the error data is added to the count number for CATV that has been counted before the check process for the error data, to get the final count number for CATV. Then the TV count number and the CATV count number are compared, and the TV mode or CATV mode is discriminated.

The auto-search operation procedure by the automatic discrimination auto-search program according to the embodiment of this device has thus been schematically described above.

Next, the auto-search operation procedure by this automatic discrimination auto-search program will be more specifically described below with reference to the flowcharts of FIGS. 3 to 8.

Prior to starting the auto-search, firstly, a TV memory CH and a CATV memory CH in the counting area of the RAM 53 are set to 0 (step S1), and the CATV 1ch is selected (step S2).

Herein, the channel tuning operation is similar to the conventional channel tuning operation based on the channel preset, but will be briefly described below. The microcomputer 50 forwards the center frequency of 1ch to the tuner 10, which then tunes in to a corresponding channel frequency (73.25 MHz). Therefore, if a television broadcasting signal exists at that channel frequency, the video IC 30 separates a synchronizing signal from the television broadcasting signal, and supplies the synchronizing signal to the microcomputer 50. The microcomputer 50 detects the synchronizing signal, and then judges whether or not an AFT change point is detectable. Herein, the voltage characteristic of AFT voltage has the shape of an inverted S character centered at a normal tuning point, though not shown in the figure. Therefore, when the AFT voltage slightly drifts from the normal tuning point, the AFT voltage shows a tendency of monotone increase or decrease in accordance with the direction of its drift. Hence, if the AFT voltage actually supplied from the video IC 30 and the voltage at the normal tuning point are compared, the direction of drift can be found. In detecting the AFT change point at this time, the AFT voltage is scanned over a range of ±2.44 MHz with reference to the center frequency of 1ch. Namely, as seen from the channel plan of FIG. 2, the TV channel plan and the CATV channel plan have the same frequency at the channels from 2ch to 13ch, and a frequency difference of 2 MHz between 14ch to 69ch for the TV channel plan and 65ch to 94ch and 100ch to 125ch for the CATV channel plan. Accordingly, when the channel tuning operation is made in the CATV channel plan, the stations for TV broadcasting can be also selected, for example.

At step S3, a determination is made whether or not 1ch of CATV has been selected by the channel tuning operation at step S2. That is, the microcomputer 50 detects a synchronizing signal, and if an AFT change point can be detected, the presence of station is determined. Herein, if the absence of station is determined, the procedure proceeds to step S8 to perform the channel tuning operation for 2ch of CATV.

On the other hand, if the presence of station is determined at step S3, the procedure proceeds to the next step S4. That is, a determination is made whether or not the PLL data after the end of channel tuning is within ±8 steps of the center frequency for NORMAL. Herein, one step is equal to 27.965 kHz as described above, so that ±8 steps amounts to ±223.72 kHz. If the PLL data is within ±8 steps (i.e., if YES is determined at step S4), "+1" is added to the CATV memory CH in the RAM 53 (step S5).

On the other hand, if the PLL data is not within ±8 steps (i.e., if NO is determined at step S4), the procedure proceeds to step S6, where a determination is made whether or not the PLL data after the end of channel tuning is within ±8 steps of the center frequency for HRC. If the PLL data is within ±8 steps (i.e., if YES is determined at step S6), "+1" is added to the CATV memory CH in the RAM 53 (step S5). On the other hand, if the PLL data is not within ±8 steps (i.e., if NO is determined at step S6), the error data off the center frequency for NORMAL is memorized in the error data storage area in the RAM 53 (step S7), and the procedure proceeds to step S8, where the next channel tuning operation for 2cH of CATV is performed.

At the next step S9, a determination is made whether or not 2ch of CATV has been selected by the channel tuning operation at step S8. That is, if the microcomputer 50 detects a synchronizing signal, and an AFT change point can be detected, the presence of station is determined. Herein, if the absence of station is determined, the procedure proceeds to step S18 to perform the next channel tuning operation for 3ch of CATV.

On the other hand, if the presence of station is determined at step S9, the procedure proceeds to the next step S10. That is, a determination is made whether or not the PLL data after the end of channel tuning is within ±8 steps of the center frequency for NORMAL. If the PLL data is within ±8 steps (i.e., if YES is determined at step S10), "+1" is added to the TV memory CH in the RAM 53 (step S11), and "+1" is added to the CATV memory CH in the RAM 53 (step S12). Then the procedure proceeds to step S16.

On the other hand, if the PLL data is not within ±8 steps (i.e., if NO is determined at step S10), the procedure proceeds to step S13, where a determination is made whether or not the PLL data after the end of channel tuning is within ±8 steps of the center frequency for HRC. If the PLL data is within ±8 steps (i.e., if YES is determined at step S13), "+1" is added to the CATV memory CH in the RAM 53 (step S12). Namely, in this case, "+1" is not added to the TV memory CH, because the center frequency does not drift in the TV broadcasting. On the other hand, if the PLL data is not within ±8 steps (i.e., if NO is determined at step S13), the error data off the center frequency for NORMAL is memorized in the error data storage area in the RAM 53 (step S14), and the procedure proceeds to step S16.

At step S16, a determination is made whether or not the previous channel has been skipped. If the previous channel has not been skipped, a continuous channel flag is turned on at the next step S17 and then the procedure proceeds to step S18.

At step S18, the processing for 3ch and 4ch of CATV is performed in the same way as at steps S9 to S17. If the processing up to 4ch of CATV is ended, the procedure then proceeds to step S19 to perform the channel tuning operation for 5ch of CATV.

Figure 4:
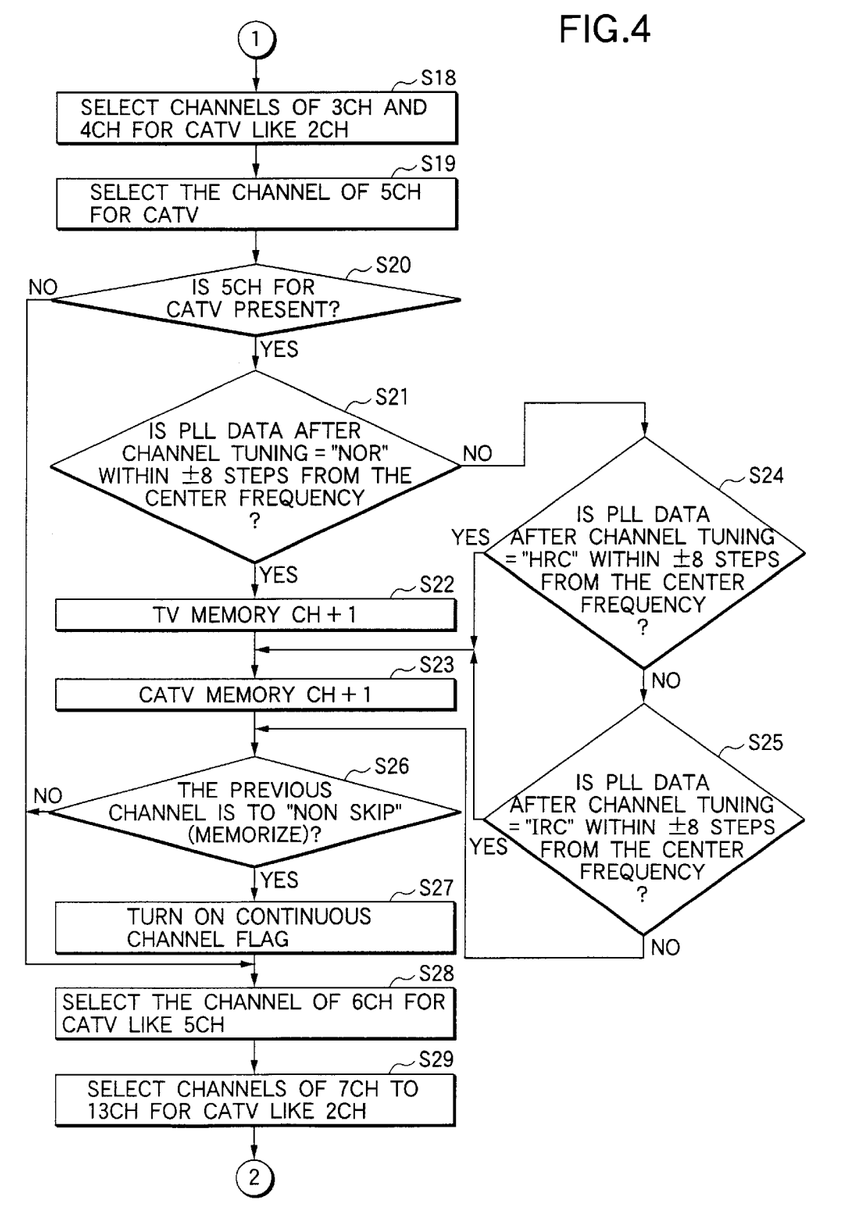
FIG. 4 is a flowchart showing the operation procedure of the auto-search performed by the automatic discrimination auto-search program.

At the next step S20, a determination is made whether or not 5ch of CATV has been selected by the channel tuning operation at step S19. That is, if the microcomputer 50 detects a synchronizing signal, and an AFT change point can be detected, the presence of station is determined. Herein, if the absence of station is determined, the procedure proceeds to step S28 to perform the next channel tuning operation for 6ch of CATV.

On the other hand, if the presence of station is determined at step S20, the procedure proceeds to the next step S21. That is, a determination is made whether or not the PLL data after the end of channel tuning is within ±8 steps of the center frequency for NORMAL. If the PLL data is within ±8 steps (i.e., if YES is determined at step S21), "+1" is added to the TV memory CH in the RAM 53 (step S22), and "+1" is added to the CATV memory CH in the RAM 53 (step S23). Then the procedure proceeds to step S26.

On the other hand, if the PLL data is not within ±8 steps (i.e., if NO is determined at step S21), the procedure proceeds to step S24, where a determination is made whether or not the PLL data after the end of channel tuning is within ±8 steps of the center frequency for HRC. If the PLL data is within ±8 steps (i.e., if YES is determined at step S24), "+1" is added to the CATV memory CH in the RAM 53 (step S23). On the other hand, if the PLL data is not within ±8 steps (i.e., if NO is determined at step S24), the procedure proceeds to step S25, where a determination is made whether or not the PLL data after the end of channel tuning is within ±8 steps of the center frequency for IRC.

If the PLL data is within ±8 steps (i.e., if YES is determined at step S25), "+1" is added to the CATV memory CH in the RAM 53 (step S23). On the other hand, if the PLL data is not within ±8 steps (i.e., if NO is determined at step S25), the procedure proceeds to step S26. That is, in this case (search operation for 5ch), the error data off the center frequency for NORMAL is not memorized in the error data storage area in the RAM 53, and the procedure proceeds to the next step. In the channel tuning operation for 5ch, as well as the case of 6ch, the error data may necessarily have a different value from other error data, because the channel frequency for HRC and the channel frequency for IRC are different from the center frequency for NORMAL. Therefore, the error data for 5ch and 6ch are not memorized in consideration of the error data check process as performed later.

At step S26, a determination is made whether or not the previous channel has been skipped. If the previous channel has not been skipped, a continuous channel flag is turned on at the next step S27, and then the procedure proceeds to step S28.

At step S28, the processing for 6ch of CATV is performed in the same way as at steps S20 to S27. If the processing up to 6ch of CATV is ended, the procedure then proceeds to step S29.

At step S29, the processing for 7ch to 13ch of CATV is performed in the same way as at steps S9 to S17. If the processing up to 13ch of CATV is ended, the procedure then proceeds to step S30 to perform the channel tuning operation for 14ch of CATV.

Figure 5:
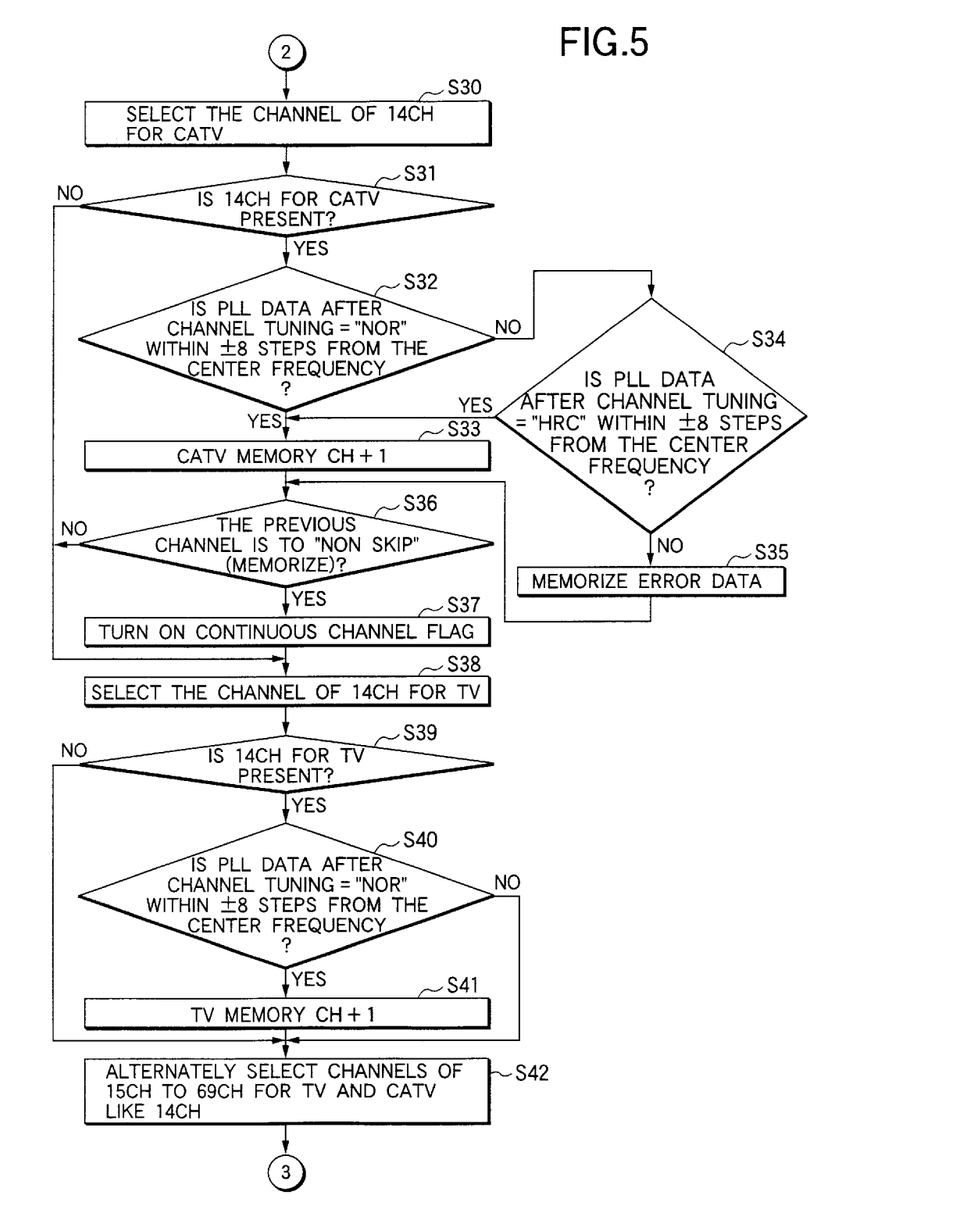
FIG. 5 is a flowchart showing the operation procedure of the auto-search performed by the automatic discrimination auto-search program.

At the next step S31, a determination is made whether or not 14ch of CATV has been selected by the channel tuning operation at step S30. That is, if the microcomputer 50 detects a synchronizing signal, and an AFT change point can be detected, the presence of station is determined. Herein, if the absence of station is determined, the procedure proceeds to step S38 to perform the next channel tuning operation for 14ch of TV.

On the other hand, if the presence of station is determined at step S31, the procedure proceeds to the next step S32. That is, a determination is made whether or not the PLL data after the end of channel tuning is within ±8 steps of the center frequency for NORMAL. If the PLL data is within ±8 steps (i.e., if YES is determined at step S32), "+1" is added to the CATV memory CH in the RAM 53 (step S33).

On the other hand, if the PLL data is not within ±8 steps (i.e., if NO is determined at step S32), the procedure proceeds to step S34, where a determination is made whether or not the PLL data after the end of channel tuning is within ±8 steps of the center frequency for HRC. If the PLL data is within ±8 steps (i.e., if YES is determined at step S34), "+1" is added to the CATV memory CH in the RAM 53 (step S33). On the other hand, if the PLL data is not within ±8 steps (i.e., if NO is determined at step S34), the error data off the center frequency for NORMAL is memorized in the error data storage area in the RAM 53 (step S35). Then the procedure proceeds to step S36 to perform the channel tuning operation for 14ch of TV.

At step S36, a determination is made whether or not the previous channel has been skipped. If the previous channel has not been skipped, a continuous channel flag is turned on at the next step S37, and then the procedure proceeds to step S38.

At step S39, a determination is made whether or not 14ch of TV has been selected by the channel tuning operation at step S38. That is, if the microcomputer 50 detects a synchronizing signal, and an AFT change point can be detected, the presence of station is determined. Herein, if the absence of station is determined, the procedure proceeds to step S42 to perform the next channel tuning operation for 15ch of TV.

On the other hand, if the presence of station is determined at step S39, the procedure proceeds to the next step S40. That is, a determination is made whether or not the PLL data after the end of channel tuning is within ±8 steps of the center frequency for TV. If the PLL data is within ±8 steps (i.e., if YES is determined at step S40), "+1" is added to the TV memory CH in the RAM 53 (step S41). If the PLL data is not within ±8 steps (i.e., if NO is determined at step S40), the procedure proceeds to step S42 to perform the channel tuning operation for 15ch and beyond of CATV.

At step S42, the processing for 15ch to 69ch of CATV is performed in the same way as at steps S30 to S37, and the processing for 15ch to 69ch of TV is performed in the same way as at steps S38 to S41, such that the processing for CATV and the processing for TV are alternately performed. If the processing up to 69ch of TV is ended, the procedure then proceeds to step S43 to perform the channel tuning operation for 70ch to 125ch of CATV.

Figure 6:
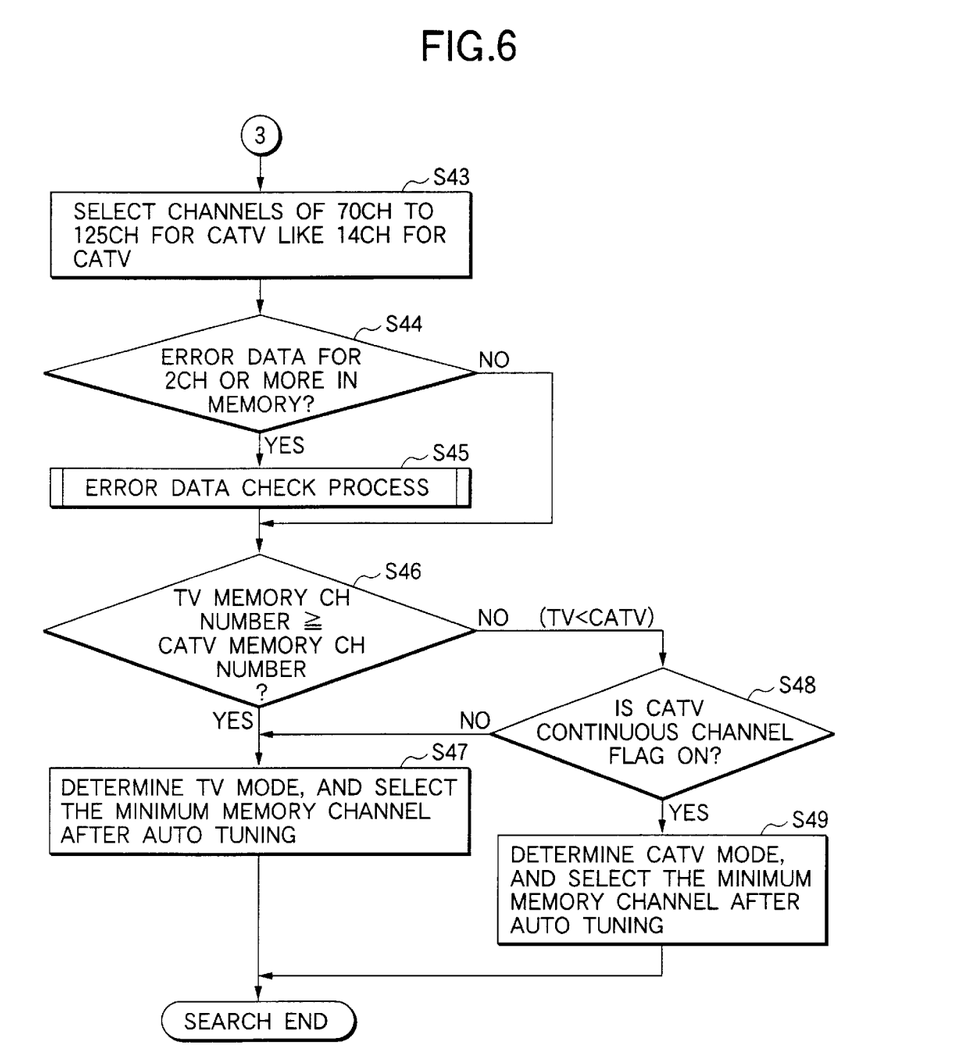
FIG. 6 is a flowchart showing the operation procedure of the auto-search performed by the automatic discrimination auto-search program.
Figure 7:
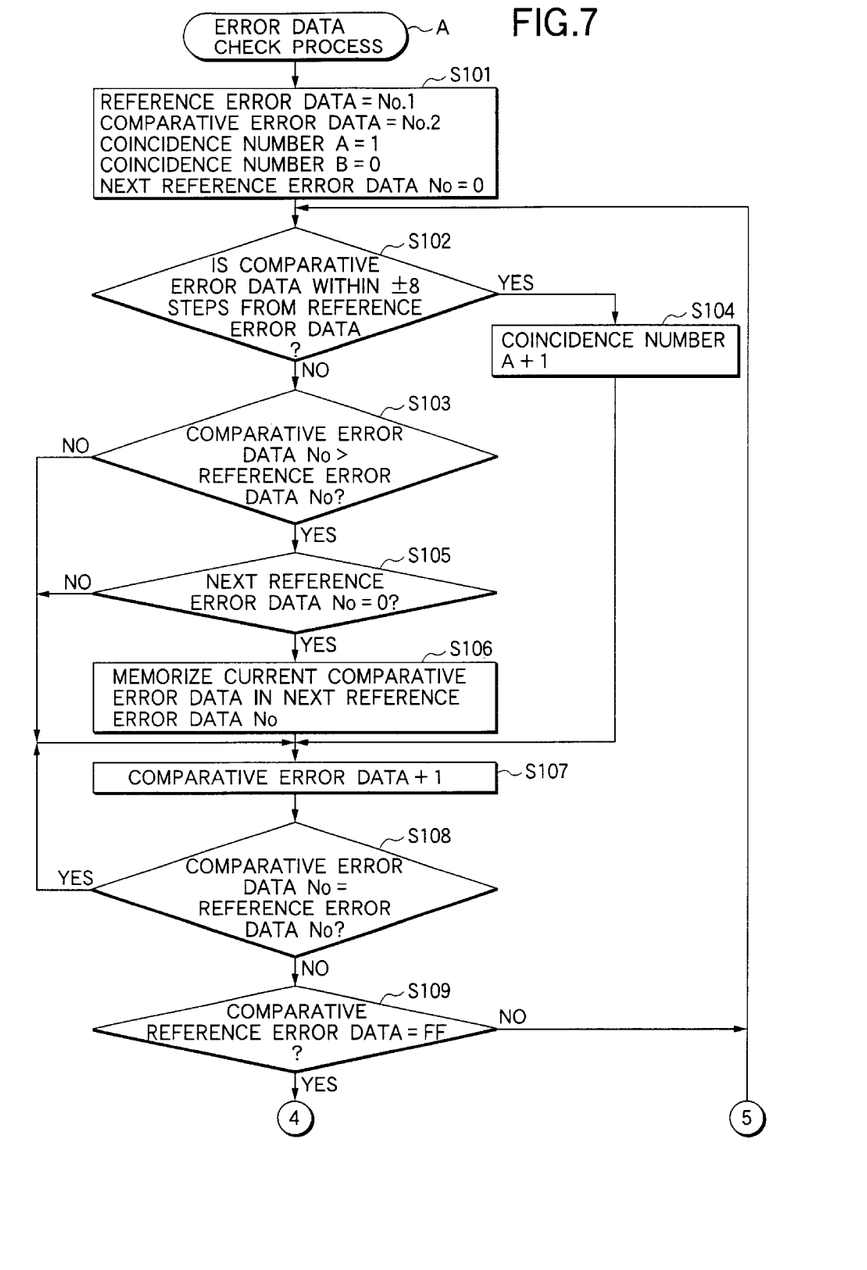
FIG. 7 is a flowchart showing an error data check process.

At step S43, the processing for 70ch to 125ch of CATV is performed in the same way as at steps S31 to S37. If the processing up to 125ch of CATV is ended, the procedure then proceeds to step S44, where a determination is made whether or not the error data for 2ch or more have been memorized. If the error data for 2ch or more have been memorized, the procedure proceeds to step S45 to execute an error data check subroutine as shown in FIGS. 7 and 8.

Figure 9:
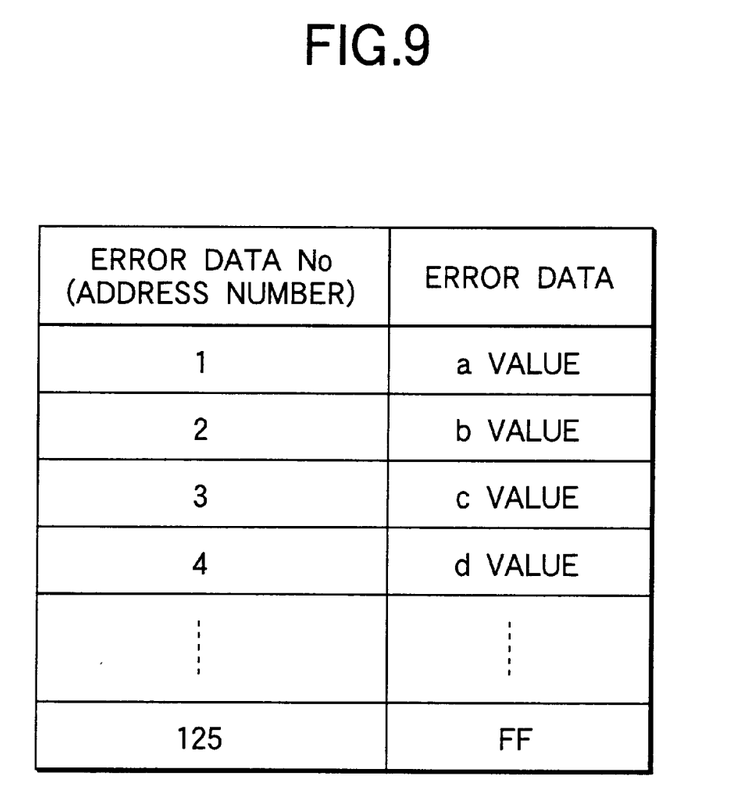
FIG. 9 is an explanatory table illustrating an example of error data memorized in an error data storage area of RAM.

In the error data check process, the error data memorized in the error data storage area of the RAM 53 is processed. Herein, an example of the error data memorized in the error data storage area of the RAM 53 is shown in FIG. 9. The initial value of the error data for the error data number (address number) 1 to 125 is set to "FF". The error data is memorized during the auto-search in the ascending order of the address number empty in the error data storage area.

Firstly, the error data (address number 1) memorized at the beginning in the error data storage area is set to the reference error data, and the error data (address number 2) memorized at the next location in the error data storage area is set to the comparative error data. The coincidence number A is set to 1 and the coincidence number B is set to 0. Further, the address number of the next reference error data is set to 0 (step S101). Herein, the numbers of coincidence A, B are preset in predetermined areas within the RAM 53.

If the initialization is finished as above, the reference error data (No. 1) at the address number 1 and the comparative error data at the address number 2 (No. 2) are compared (step S102) to make a determination whether or not the comparative error data (No. 2) is within ±8 steps from the reference error data (No. 1). Herein, one step is equal to 27.965 kHz as described above, so that ±8 steps amounts to ±223.72 kHz. If the comparative error data (No. 2) is within ±8 steps from the reference error data (No. 1) (i.e., if YES is judged at step S102), the comparative error data (No. 2) is included within the same group as the reference error data (No. 1) (i.e., with an approximately same width of drift from the center frequency). Thereby, the coincidence number A is incremented by +1 (step S104). Then, the procedure proceeds to step S107.

On the other hand, at step S102, if the comparative error data (No. 2) is not within ±8 steps from the reference error data (No.1) (i.e., if NO is judged at step S102), a determination is made at step S103 whether or not the address number of the comparative error data is larger than the address number of the reference error data. If it is confirmed that the address number of the comparative error data is larger than the address number of the reference error data (i.e., YES is judged at step S103), at step S105, a determination is made whether or not the next reference error data has been set, namely, the address number of the next reference error data is equal to zero. Herein, if the address number is equal to zero (i.e., if YES is judged at step S105), the address number of the current comparative error data is set as the next reference error data (step S106). That is, when the comparison of the current reference error data (No. 1) with subsequent all comparative error data has been completed, the next reference error data set here is defined as the new reference error data, and the processing from step S102 is performed again.

In this way, as a result of judgement at step S102, the coincidence number A is incremented by +1 (step S104), or the next reference error data is set (step S106). Then, the address number of the comparative error data is incremented by +1 (step S107). After making a determination at step S108 and a determination at step S109, the procedure returns to step S102. And the comparative error data (No. 3) of the address number 3 and the reference error data (No. 1) are compared to determine whether the comparative error data (No. 3) is within ±8 steps from the reference error data (No. 1).

In this way, by repeating the process from step S102 to step S109, the comparative error data is successively compared with the reference error data (No. 1). In the case where the comparative error data is within ±8 steps from the reference error data (No. 1), the coincidence number A is incremented by +1 every time. If the comparison is made up to the last error data memorized in the error data storage area (i.e., if the value of the comparative error data is judged to be "FF" at step S109), the coincidence number A for the group included in the reference error data (No. 1) has been counted at this time.

Accordingly, at the next step S110, the counted coincidence number A and the preset coincidence number B are compared. As described above, since the coincidence number B at this time is equal to an initial value of zero, the counted number n1 for the coincidence number A is compared with zero. As a result, if the counted number n1 for the coincidence number A is greater than zero, the counted number n1 for this coincidence number A is memorized in the coincidence number B (step S111), and then the coincidence number A is restored to an initial value of 1 (step S112). Namely, the largest value (n1) for the coincidence number (counted number) is memorized in the coincidence number B.

Thereafter, at step S113, a determination is made whether or not the next reference error data has been set. If the next reference error data has been set (i.e., if NO is judged at step S113), the next reference error data that has been set (e.g., error data of the address number 4) is set as the current reference error data (No. 4) (step S114), the next reference error data is set to the address number 0 again, and the comparative error data is set at the address number 1 (No. 1). Then, the procedure returns to step S102 to repeat the above process.

In this way, by repeating the process from step S102 to step S109 for the newly set reference error data (No. 4), the comparative error data is compared with the reference error data (No. 4) successively. In the case where the comparative error data is within ±8 steps from the reference error data (No. 4), the coincidence number A is incremented by +1 every time. If the comparison up to the last error data memorized in the error data storage area has been ended (i.e., if the value of the comparative error data is judged to be "FF" at step S109), the coincidence number A for the group included in the reference error data (No. 4) has been counted at this time.

Therefore, at the next step S110, the counted coincidence number A and the preset coincidence number B are compared. The coincidence number B at this time contains the count number n1 that has been set previously, so that the count number n2 for the coincidence number A and the count number n1 for the coincidence number B are compared. Consequently, if the count number n1 for the coincidence number A is greater than the count number n2 for the coincidence number B, the count number n1 for the coincidence number A is overwritten on the coincidence number B (step S111), and the coincidence number A is restored to an initial value of 1 (step S112). That is, the coincidence number B contains the largest count number at all times.

In this way, as a result of repeating the process from step S102 to step S115, if the next reference error data is not set (i.e., if the address number of the next reference error data is set to zero) at step S113, the procedure proceeds to step S116 to make a determination whether or not the count number memorized in the coincidence number B is greater than 1. If the coincidence number B is equal to 1, the error data check process is ended without incrementing the count number, because the CATV station is present. On the other hand, if the count number for the coincidence number B is greater than 1, the count number for the coincidence number B is added to the count number for CATV that has been counted before the error data check process (during the auto-search) to have the ultimate count for CATV (step S117). Then the error data check process is ended.

Thus, if the error data check process is ended, the procedure returns to a main routine of FIG. 6, and proceeds to step S46.

That is, at step S46, a comparison is made between the TV count number after the end of auto-search from 1ch to 125ch and the CATV count number appropriately added by the error data check process. If the TV memory CH number is greater than or equal to the CATV memory CH number (i.e., if YES is judged at step S46), a TV mode is discriminated, the auto tuning is ended, and the minimum memory channel in the TV mode is selected (step S47).

On the other hand, if the CATV memory CH number is greater than the TV memory CH number (i.e., if NO is judged at step S46), a discrimination is made at step S48 whether or not there is a continuous channel among the channels that have been judged to be station present in the CATV channel tuning operation. In the case of a CATV mode, the continuous channel necessarily exists. This discrimination can be made by checking to see whether or not the continuous channel flag is on at step S17.

If there is no continuous channel (i.e., if NO is judged at step S48), the TV mode is judged, and the minimum memory channel in the TV mode is selected after the end of auto tuning (step S47). On the other hand, if the continuous channel exists (i.e., if YES is judged at step S48), the CATV mode is judged, and the minimum memory channel in the CATV mode is selected after the end of auto tuning (step S49).

In the above embodiment, an automatic discrimination auto-search program is executed over the entire frequency band (1ch to 125ch) for the CATV channel plan. The automatic discrimination auto-search program may be executed over the partial frequency band (e.g., 14ch to 69ch), whereby the TV mode and the CATV mode can be correctly discriminated.

With a television receiving apparatus of this device, a determination is made whether or not the channel frequency of a station is within a fixed frequency range from the center frequency, and the number of station present channels in a channel plan to which the station belongs is counted up, if the channel frequency of the station is within the fixed frequency range from the center frequency. In this way, the number of channels can be counted more correctly.

Also, with the television receiving apparatus of this device, since the number of station present channels contained in each channel plan is counted during the automatic discrimination auto-search for the channel plan, and ultimately the channel plan is discriminated through the comparison of the total number of channels by determining whether or not the total number of channels for the first channel plan is smaller than the total number of channels for the second channel plan, whereby it is possible to eliminate the influence of the noise and discriminate a channel mode at higher accuracy. The specific examples of the channel plan can be provided in such a way that the first channel plan is used for ground wave broadcasting, and the second channel plan is used for cable television broadcasting.

With a television receiving apparatus of this device, there is further provided an error data check process for making a determination whether or not to count up a station that is judged to be present but not counted at that time because the frequency is not within a fixed frequency from the center frequency as being present for the second channel plan to add to the count number. Namely, even in the case where the second channel plan drifts from the normal frequency, the error data check process is performed, and the station can be counted as a broadcasting station included in the second channel plan, so that a discrimination between the TV mode and the CATV mode can be made more correctly.

Also, with a television receiving apparatus of this device, in the case where the count number for the first channel plan is smaller than the count number for the second channel plan, a determination is made whether or not there is a continuous channel among the channels which are judged that station is present, and a second channel plan mode is discriminated only if there is the continuous channel. Namely, in the CATV channel plan that is the second channel plan, since the continuous channel necessarily exists, the continuity of channels is discriminated, when the CATV mode is discriminated based on the comparison between the count numbers, so that a discrimination between the TV mode and the CATV mode can be made more correctly.

What is claimed is:

1. A television receiving apparatus capable of receiving signals of a desired frequency in correspondence to a first channel plan having predetermined channel frequencies assigned, and a second channel plan containing the channel frequencies assigned to said first channel plan and having other channel frequencies assigned in the frequency bands not assigned to said first channel plan, said television receiving apparatus comprising:

channel number counting means for counting up the number of station present channels in the channel plan to which a station belongs, if it is judged that the channel frequency of said station is within a fixed frequency range from a center frequency, wherein said channel plan is ground wave broadcasting, and said second channel plan is cable television broadcasting, wherein said channel number counting means stores the error data off a center frequency in a memory, if it is determined that the channel frequency of a station that is judged to be present is outside a fixed frequency range from the center frequency, for all the stations which are judged that station is present, wherein the error data first stored in said memory is set as the reference error data, the error data stored subsequently is set as the comparative error data, and the comparative error data is compared in succession with the reference error data in such a way that if the comparative error data is within the fixed frequency range from the reference error data, the comparative error data is judged to be contained within the same group, and the coincidence number is counted up as being contained within the same group, or if the comparative error data is outside the fixed frequency range from the reference error data, a check is made whether or not the next reference error data has been already registered, and the comparative error data is registered as the next reference error data, when the next reference error data has not been registered, until the comparison for all the error data is completed, in which the coincidence number is counted up for one group, and then the next reference error data registered ahead and the error data stored subsequently as the comparative error data are compared in the same way as previously, the coincident number is counted up for another one group until there is no next reference error data registered, and wherein the coincident number for the largest group among the thus obtained groups is added and counted up to the number of station present channels for said second channel plan.

2. A television receiving apparatus capable of receiving signals of a desired frequency in correspondence to a first channel plan having predetermined channel frequencies assigned, and a second channel plan containing the channel frequencies assigned to said first channel plan and having other channel frequencies assigned in the frequency bands not assigned to said first channel plan, said television receiving apparatus comprising:

station presence judging means for judging whether a broadcasting station is present at not at a channel frequency assigned to each channel plan by searching all or part of the frequency bands contained in said first channel plan or said second channel plan;

channel number counting means for judging whether or not the channel frequency of a broadcasting station is within a fixed frequency range from a center frequency, if said station presence judging means judges the presence of said broadcasting station, and counting up the number of station present channels in the channel plan to which said broadcasting station belongs, if the channel frequency of the broadcasting station is within the fixed frequency range from the center frequency, for all the broadcasting stations which are judged to be present; and channel plan discriminating means for comparing the number of channels for said first channel plan and the number of channels for said second channel plan which are counted by said channel number counting means, and discriminating a first channel plan mode, if the count number for said first channel plan is greater than or equal to the count number for said second channel plan, or discriminating a second channel plan mode, if the count number for said first channel plan is smaller than the count number for said second channel plan, wherein said channel number counting means stores the error data off a center frequency in a memory, if it is determined that the channel frequency of a station that is judged to be present is outside a fixed frequency range from the center frequency, for all the stations which are judged that station is present, wherein the error data first stored in said memory is set as the reference error data, the error data stored subsequently is set as the comparative error data, and the comparative error data is compared in succession with the reference error data in such a way that if the comparative error data is within the fixed frequency range from the reference error data, the comparative error data is judged to be contained within the same group, and the coincidence number is counted up as being contained within the same group, or if the comparative error data is outside the fixed frequency range from the reference error data, a check is made whether or not the next reference error data has been already registered, and the comparative error data is registered as the next reference error data, when the next reference error data has not been registered, until the comparison for all the error data is completed, in which the coincidence number is counted up for one group, and then the next reference error data registered ahead and the error data stored subsequently as the comparative error data are compared in the same way as previously, the coincident number is counted up for another one group until there is no next reference error data registered, and wherein the coincident number for the largest group among the thus obtained groups is added and counted up to the number of station present channels for said second channel plan.

3. The television receiving apparatus according to claim 2, wherein said channel plan discriminating means discriminates whether or not there is a continuous channel among the channels which are judged that station is present, if the count number for said first channel plan is smaller than the count number for said second channel plan, and discriminating a second channel plan mode only if there is the continuous channel, or discriminating a first channel plan mode if there is no continuous channel.

4. The television receiving apparatus according to claim 2, wherein said fixed frequency range is approximately ±200 KHz.

5. A television receiving apparatus capable of receiving signals of a desired frequency in correspondence to a first channel plan having predetermined channel frequencies assigned, and a second channel plan containing the channel frequencies assigned to said first channel plan and having other channel frequencies assigned in the frequency bands not assigned to said first channel plan;

said television receiving apparatus comprising:

station presence judging means for judging whether a broadcasting station is present or not at a channel frequency assigned to each channel plan by searching all or part of the frequency bands contained in said first channel plan or said second channel plan;

channel number counting means for judging whether or not the channel frequency of a broadcasting station is only within a fixed frequency range from a center frequency, wherein said fixed frequency range is a predetermined size smaller than the bandwidth of the corresponding channel, if said station presence judging means judges the presence of said broadcasting station, and counting up the number of station present channels in the channel plan to which said broadcasting station belongs, if the channel frequency of the broadcasting station is within the fixed frequency range from the center frequency, for all the broadcasting stations which are judged to be present; and channel plan discrimination means for comparing the number of channels for said first channel plan and the number of channels for said second channel plan which are counted by said channel number counting means, and discrimination a first channel plan mode, if the count number for said first channel plan is greater than or equal to the count number for said second channel plan, or discrimination a second channel plan mode, if the count number for said first channel plan is smaller than the count number for said second channel plan;

wherein said channel number counting means stores the error data off a center frequency in a memory, if it is determined that the channel frequency of a station that is judged to be present is outside a fixed frequency range from the center frequency, for all the stations which are judged that station is present, wherein the error data first stored in said memory is set as the reference error data, the error data stored subsequently is set as the comparative error data, and the comparative error data is compared in succession with the reference error data in such a way that if the comparative error data is within the fixed frequency range from the reference error data, the comparative error data is judged to be contained within the same group, and the coincidence number is counted up as being contained within the same group, or if the comparative error data is outside the fixed frequency range from the reference error data, a check is made whether or not the next reference error data has been already registered, and the comparative error data is registered as the next reference error data, when the next reference error data has not been registered, until the comparison for all the error data is completed, in which the coincidence number is counted up for one group, and then the next reference error data registered ahead and the error data stored subsequently as the comparative error data are compared in the same way as previously, the coincident number is counted up for another one group until there is no next reference error data registered, and wherein the coincident number for the largest group among the thus obtained groups is added and counted up to the number of station present channels for said second channel plan.

6. The television receiving apparatus according to claim 5, wherein said first channel plan is ground wave broadcasting, and said second channel plan is cable television broadcasting.

7. The television receiving apparatus of claim 5, wherein said channel plan discriminating means discriminates whether or not there is a continuous channel among the channels which are judged that station is present, if the count number for said first channel plan is smaller than the count number for said second channel plan, and discriminating a second channel plan mode only if there is the continuous channel, or discriminating a first channel plan mode if there is no continuous channel.

8. The television receiving apparatus according to claim 5, wherein said fixed frequency range is approximately ±200 kHz.

* * * * *